US012784996B2

(12) United States Patent
Hachisu et al.

(10) Patent No.: US 12,784,996 B2
(45) Date of Patent: Nov. 3, 2026

(54) ELECTROLYTIC CAPACITOR AND SEATING PLATE

(71) Applicant: Panasonic Intellectual Property Management Co., Ltd., Osaka (JP)

(72) Inventors: Doyu Hachisu, Yamaguchi (JP); Tomoyuki Tashiro, Yamaguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 341 days.

(21) Appl. No.: 18/684,656

(22) PCT Filed: Aug. 26, 2022

(86) PCT No.: PCT/JP2022/032155
§ 371 (c)(1),
(2) Date: Aug. 27, 2024

(87) PCT Pub. No.: WO2023/032831
PCT Pub. Date: Mar. 9, 2023

(65) Prior Publication Data

US 2024/0420898 A1 Dec. 19, 2024

(30) Foreign Application Priority Data

Aug. 31, 2021 (JP) ................................ 2021-141819

(51) Int. Cl.
*H01G 9/10* (2006.01)
*H01G 9/008* (2006.01)
(Continued)

(52) U.S. Cl.
CPC ............... *H01G 9/10* (2013.01); *H01G 9/008* (2013.01); *H01G 9/06* (2013.01); *H01G 9/08* (2013.01)

(58) Field of Classification Search
CPC ........... H01G 9/10; H01G 9/008; H01G 9/06; H01G 9/08
See application file for complete search history.

(56) References Cited

U.S. PATENT DOCUMENTS 5,420,748 A 5/1995 Ryu
2008/0117567 A1 5/2008 Nakamura et al.

FOREIGN PATENT DOCUMENTS

JP 61-051728 U 4/1986
JP H0236274 Y2 * 10/1990
(Continued)

OTHER PUBLICATIONS

Translation JP 2001176752A (Year: 2001).*
International Search Report of PCT application No. PCT/JP2022/032155 dated Nov. 15, 2022.

*Primary Examiner* — Eric W Thomas
(74) *Attorney, Agent, or Firm* — Rimon P.C.

(57) ABSTRACT

An electrolytic capacitor includes a capacitor body and a seating plate having an attachment surface to which the capacitor body is attached. The seating plate has a pair of through-holes into which a pair of lead terminals is inserted, respectively. A mounting surface of the seating plate has a pair of terminal storage grooves and a projection. Distal end portions of the pair of lead terminals are inserted into the pair of terminal storage grooves, respectively. The projection protrudes from a portion including at least an intermediate portion between the pair of through-holes. The projection includes a narrow portion and wide portions. The narrow portion is positioned between the pair of through-holes. The wide portions are disposed respectively at both sides with respect to the narrow portion. A width of the wide portion is larger than a width of the narrow portion.

11 Claims, 12 Drawing Sheets

(51) Int. Cl.
*H01G 9/06* (2006.01)
*H01G 9/08* (2006.01)

(56) References Cited

FOREIGN PATENT DOCUMENTS

| | | | | |
|---|---|---|---|---|
| JP | 03-038013 | | | 2/1991 |
| JP | 07-074053 | | | 3/1995 |
| JP | 2001-035751 | | | 2/2001 |
| JP | 2001176752 | A | * | 6/2001 |
| JP | 2018137264 | A | * | 8/2018 |
| WO | 2006/051938 | | | 5/2006 |

* cited by examiner

ELECTROLYTIC CAPACITOR AND SEATING PLATE

TECHNICAL FIELD

The present disclosure relates to an electrolytic capacitor, and a seating plate. More specifically, the present disclosure relates to a surface mounting-type electrolytic capacitor and a seating plate included in the surface mounting-type electrolytic capacitor.

BACKGROUND

Unexamined Japanese Patent Publication No. 2001-35751 discloses a surface-mounting type electrolytic capacitor in which an insulating plate is disposed to come into contact with a bottom surface. A protrusion having a thickness equal to or larger than a plate thickness of a pair of plate-shaped lead terminals of the surface-mounting type electrolytic capacitor is provided on an outer surface of the insulating plate. A distal end portion of the plate-shaped lead terminal passing through a through-hole of the insulating plate is bent along the bottom surface of the insulating plate. When the distal end portion of the lead terminal is bent along the bottom surface of the insulating plate, positions of the pair of plate-shaped lead terminals and the protrusion are flush with each other, and there is an advantage that mounting stability is improved.

SUMMARY

Technical Problem

In the surface-mounting type electrolytic capacitor of Unexamined Japanese Patent Publication No. 2001-35751, there is a limit to increase a size of a projection provided on the bottom surface of the insulating plate in order to secure a space for a printed solder paste to escape when the surface-mounting type electrolytic capacitor is mounted on a substrate. When the insulating plate is thinned for downsizing, there is a possibility that warpage is caused in the insulating plate, and there is a possibility that joint strength in a state of being mounted on the substrate is reduced.

The present disclosure provides an electrolytic capacitor and a seating plate that can suppress a decrease in joint strength in a state of being mounted on a substrate.

Solution to Problem

An electrolytic capacitor according to an aspect of the present disclosure includes a capacitor body and a seating plate. The capacitor body includes a capacitor element, a container housing the capacitor element, and a pair of lead terminals protruding from a bottom surface of the container. The container has a bottomed cylindrical shape. The capacitor body is attached to an attachment surface of the seating plate. The seating plate has a pair of through-holes into which the pair of lead terminals are inserted, respectively. The seating plate has a mounting surface opposite to the attachment surface. The mounting surface has a pair of terminal storage grooves and a projection. Distal end portions of the pair of lead terminals inserted into the pair of through-holes, respectively, to be bent along the mounting surface are inserted into the pair of terminal storage grooves, respectively. The projection protrudes from a portion including at least an intermediate portion between the pair of through-holes. The projection includes a narrow portion and wide portions. The narrow portion is positioned between the pair of through-holes. The wide portions are disposed respectively at both sides with respect to the narrow portion in a second axis intersecting a first axis along which the pair of through-holes are arranged. A width of the wide portion along the first axis is larger than a width of the narrow portion along the first axis.

A seating plate according to another aspect of the present disclosure is provided in an electrolytic capacitor. The electrolytic capacitor includes a capacitor body that includes a capacitor element, a container housing the capacitor element, and a pair of lead terminals protruding from a bottom surface of the container. The container has a bottomed cylindrical shape. The capacitor body is attached to an attachment surface of the seating plate. The seating plate has a pair of through-holes into which the pair of lead terminals are inserted, respectively. The seating plate has a mounting surface opposite to the attachment surface. The mounting surface has a pair of terminal storage grooves and a projection. Distal end portions of the pair of lead terminals inserted into the pair of through-holes, respectively, to be bent along the mounting surface are inserted into the pair of terminal storage grooves, respectively. The projection protrudes from a portion including at least an intermediate portion between the pair of through-holes. The projection includes a narrow portion and wide portions. The narrow portion is positioned between the pair of through-holes. The wide portions are disposed respectively at both sides with respect to the narrow portion in a second axis intersecting a first axis along which the pair of through-holes are arranged. A width of the wide portion along the first axis is larger than a width of the narrow portion along the first axis.

Advantageous Effect of Invention

According to the present disclosure, it is possible to suppress the decrease in joint strength in a state of being mounted on the substrate.

DESCRIPTION OF EMBODIMENT

Exemplary Embodiment

(1) Overview

Figure 1:
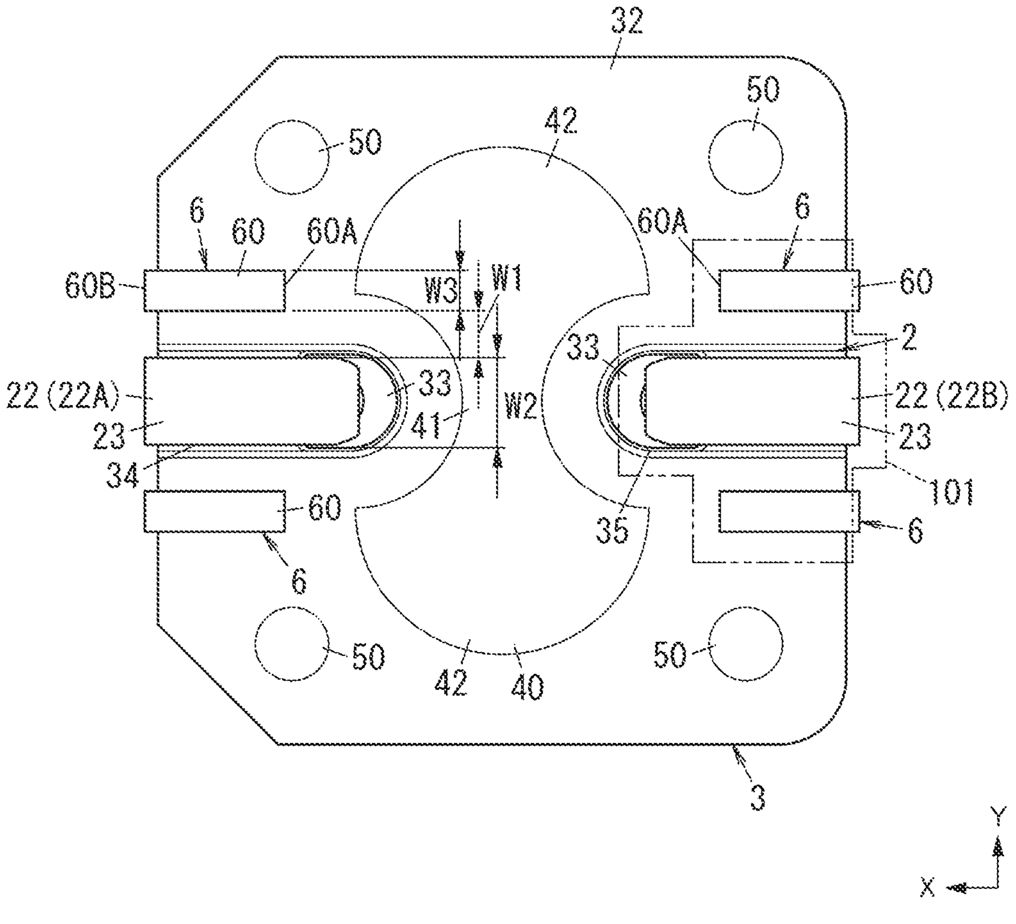
FIG. 1 is a bottom view illustrating an electrolytic capacitor according to an exemplary embodiment of the present disclosure.

Hereinafter, an electrolytic capacitor and a seating plate according to an exemplary embodiment will be described with reference to the drawings. Incidentally, the following exemplary embodiment is merely one of various exemplary embodiments of the present disclosure. The following exemplary embodiment can be variously changed in accordance with factors such as a design, as long as the object of the present disclosure can be achieved. In addition, the drawings described in the following exemplary embodiment are schematic representations, and ratios of sizes and thicknesses of components in the drawings does not necessarily need to reflect actual dimensional ratio.

As illustrated in FIGS. 1 to 4, electrolytic capacitor 1 of the present exemplary embodiment includes capacitor body 2 and seating plate 3.

Capacitor body 2 includes container 21, which has a bottomed cylindrical shape, housing a capacitor element, and a pair of lead terminals 22 protruding from a bottom surface of container 21.

Capacitor body 2 is attached to attachment surface 31 of seating plate 3. A pair of through-holes 33 into which the pair of lead terminals 22 are inserted are provided in seating plate 3. A pair of terminal storage grooves 34 and projection 40 are provided on mounting surface 32 of seating plate 3 opposite to attachment surface 31. Distal end portions 23 of the pair of lead terminals 22 inserted into the pair of through-holes 33, respectively, to be bent along mounting surface 32 are inserted into the pair of terminal storage grooves 34, respectively. Projection 40 protrudes from a portion including at least an intermediate portion between the pair of through-holes 33. Projection 40 includes narrow portion 41 positioned between the pair of through-holes 33 and wide portions 42 disposed respectively at both sides with respect to narrow portion 41 in a second axis intersecting a first axis along which the pair of through-holes 33 are arranged. A width of wide portion 42 along the first axis is larger than a width of narrow portion 41 along the first axis.

In electrolytic capacitor 1 of the present exemplary embodiment, since projection 40 provided on mounting surface 32 of seating plate 3 includes wide portions 42 disposed respectively at both sides with respect to narrow portion 41 in the second axis, an area of projection 40 can be increased as compared with a case where there are no wide portions 42. Accordingly, as compared with a case where there are no wide portions 42, since rigidity of seating plate 3 can be increased and warpage of seating plate 3 can be suppressed, it is possible to suppress a decrease in joint strength in a state of being mounted on substrate 100. Note that, in the following exemplary embodiment, second projection 50 is further provided on mounting surface 32, and projection 40 described above may be referred to as first projection 40 in order to distinguish from second projection 50.

(2) Details

Hereinafter, electrolytic capacitor 1 and seating plate 3 according to the present exemplary embodiment will be described in detail with reference to FIGS. 1 to 9. Note that, in the following description, in FIG. 1, the first axis along which the pair of through-holes 33 are arranged, which is, specifically, the first axis along a straight line connecting centers of the pair of through-holes 33, is defined as an X-axis. Further, the second axis intersecting the first axis is defined as a Y-axis orthogonal to the X-axis, and an axis orthogonal to the X-axis and the Y-axis is defined as a Z-axis. Further, an X-axis direction is defined as a left-right direction, a Y-axis direction is defined as a front-rear direction (depth direction), a Z-axis direction is defined as an up-down direction. A positive orientation in the X-axis direction is defined as a left side, a positive orientation in the Y-axis direction is defined as a front side, and a positive orientation in the Z-axis direction is defined as an upper side. However, these directions are merely examples, and are not intended to limit directions of electrolytic capacitor 1 and seating plate 3 during use. In addition, arrows that point the directions are illustrated only for explanation in the drawings. The arrows are unsubstantial.

As a typical example, the present exemplary embodiment is described under an assumption that electrolytic capacitor 1 be an aluminum electrolytic capacitor.

Figure 2:
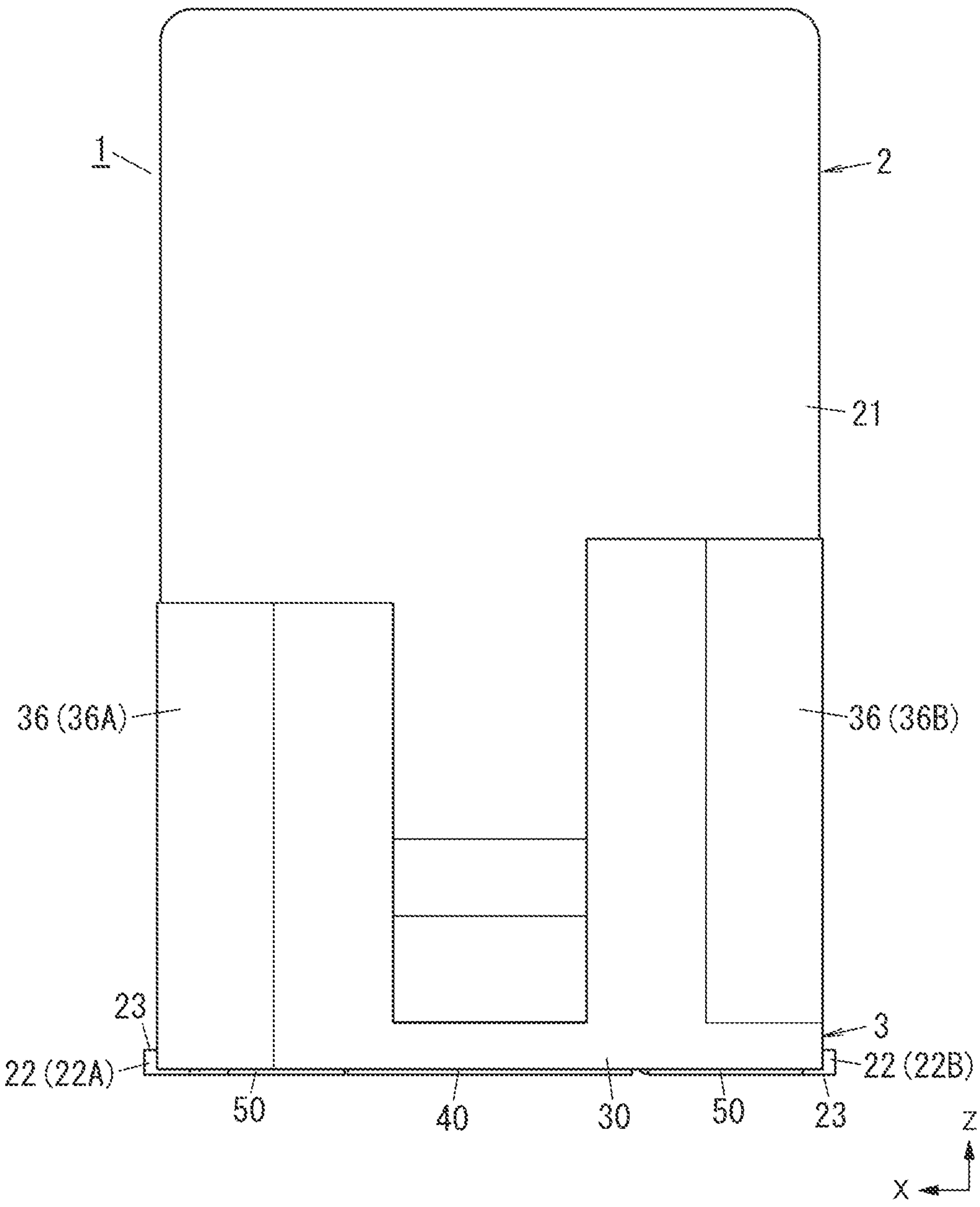
FIG. 2 is a front view illustrating the electrolytic capacitor.
Figure 3:
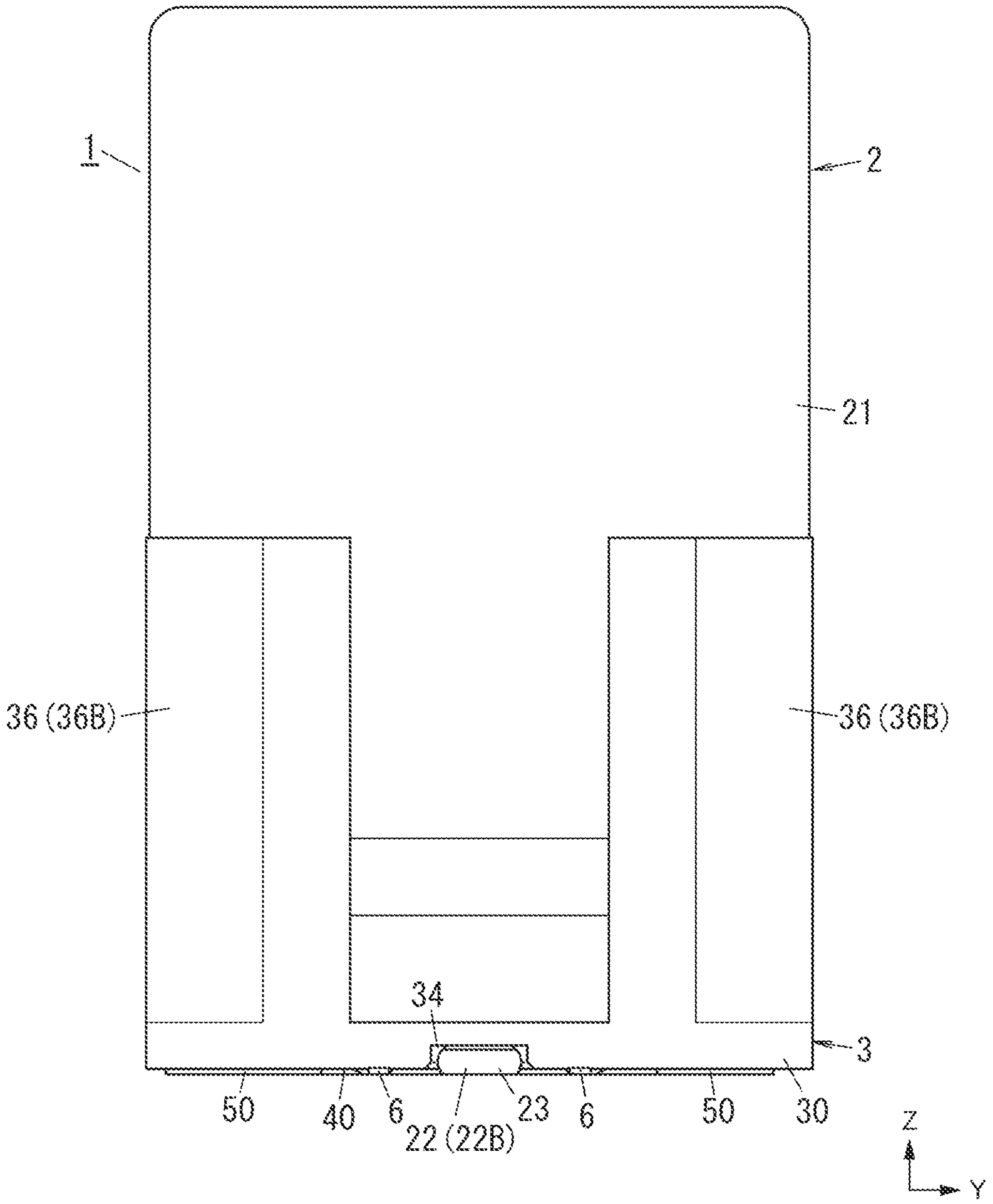
FIG. 3 is a right side view illustrating the electrolytic capacitor.
Figure 4:
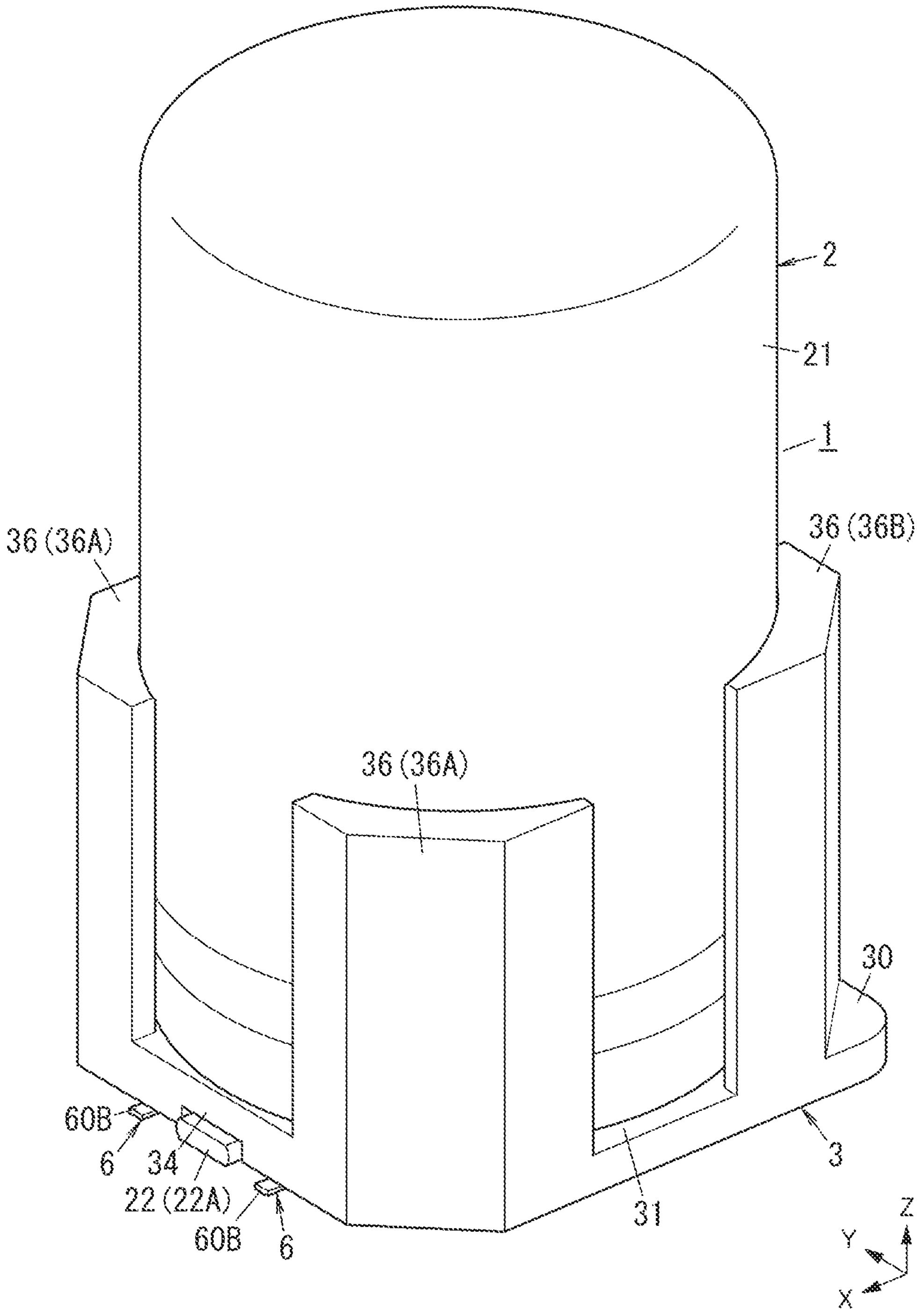
FIG. 4 is an external perspective view illustrating the electrolytic capacitor.

As illustrated in FIGS. 2 to 4, electrolytic capacitor 1 includes capacitor body 2. Capacitor body 2 includes container 21 and the pair of lead terminals 22.

Container 21 is formed in a hollow cylindrical shape. Container 21 includes a hollow cylindrical metal case having an open bottom, and a sealing member that closes the bottom of the metal case. A material of the metal case in container 21 is, for example, one or more materials selected from a group consisting of aluminum, stainless steel, copper, iron, and brass, and alloys thereof.

The capacitor element is housed inside container 21. The capacitor element includes an anode body, a cathode body, and a separator. The anode body includes a metal foil containing valve metal such as aluminum, tantalum, or niobium, and a dielectric layer formed on a surface of the metal foil. The cathode body includes a metal foil such as aluminum. The separator is disposed between the anode body and the cathode body and holds electrolyte. As the electrolyte, solid electrolyte such as conductive polymer, or an electrolytic solution can be used, for example. Otherwise, conductive polymer and an electrolytic solution may both be used. The anode body, the cathode body, and the separator are each formed into a sheet shape. The anode body, the cathode body, and the separator are winded into a roll shape in an overlapped state.

The pair of lead terminals 22 protrudes downward from the sealing member of container 21. Here, among the pair of lead terminals 22, lead terminal 22 electrically connected to the anode body serves as lead terminal 22A on an anode side, and lead terminal 22 electrically connected to the cathode body serves as lead terminal 22B on a cathode side.

Seating plate 3 has an electrical insulation property. A material of seating plate 3 is, for example, a synthetic resin material such as polyphenylene sulfide (PPS) or polyphthalamide (PPA).

Figure 5:
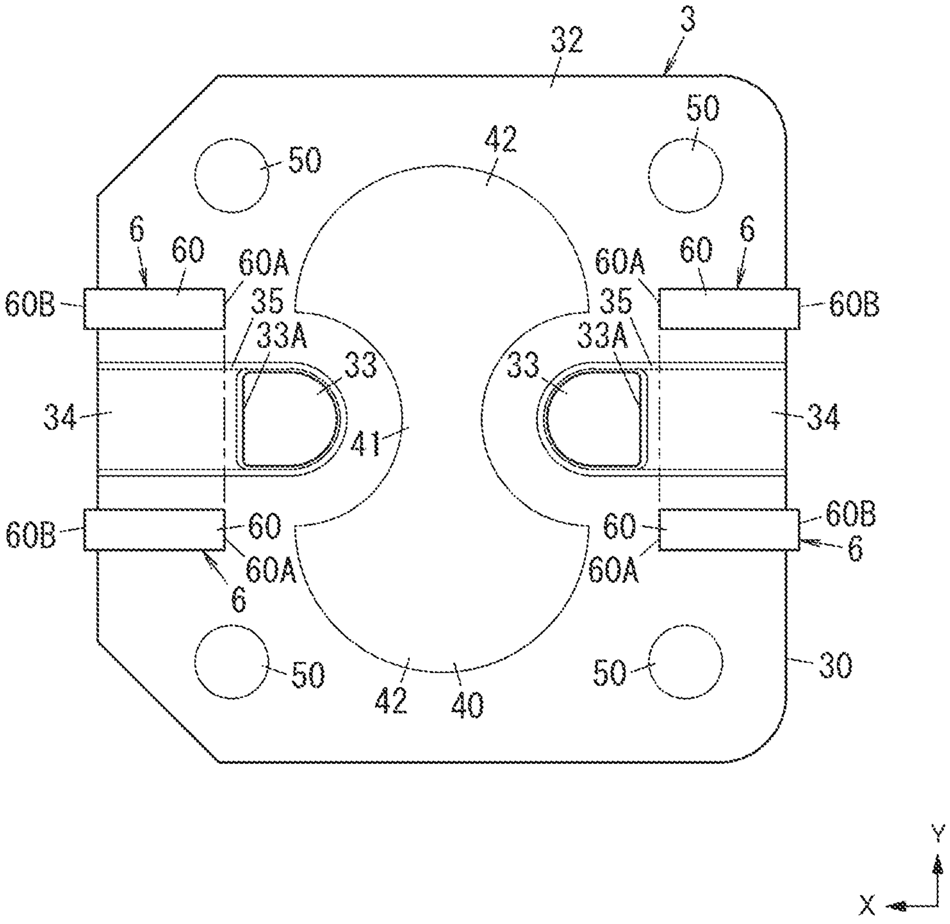
FIG. 5 is a bottom view illustrating a seating plate of the electrolytic capacitor.
Figure 6:
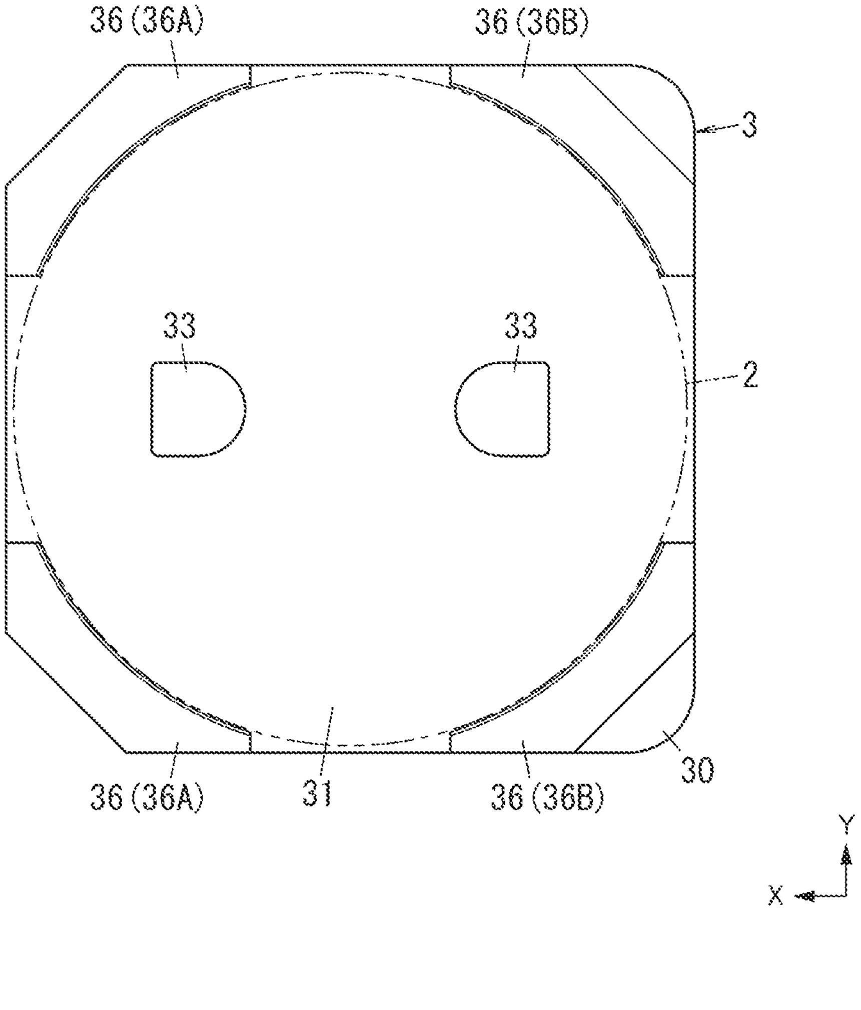
FIG. 6 is a top view illustrating the seating plate.
Figure 7:
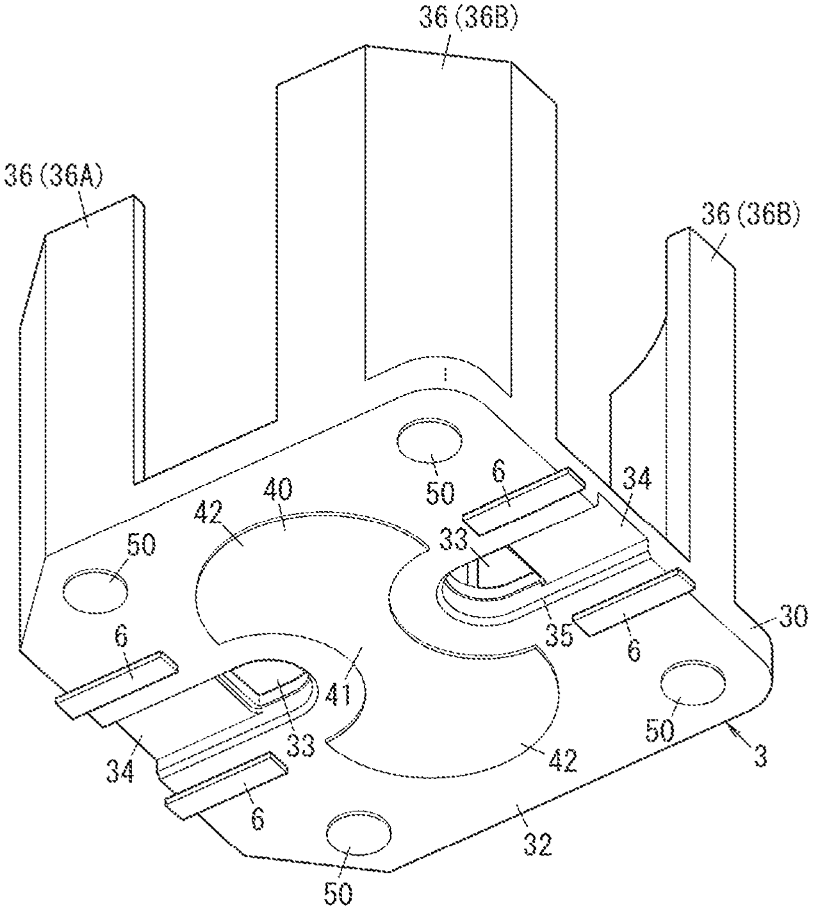
FIG. 7 is a perspective view illustrating the seating plate as viewed from below.

As illustrated in FIGS. 5 to 7, seating plate 3 includes base 30 in which capacitor body 2 is attached to attachment surface 31 (upper surface), and four columnar portions 36 protruding upward from attachment surface 31 of base 30.

Inner side surfaces of four columnar portions 36 are formed in curved surfaces along a peripheral surface of cylindrical capacitor body 2 having a cylindrical shape, and capacitor body 2 attached to attachment surface 31 is supported by four columnar portions 36. That is, columnar portions 36 that support capacitor body 2 are provided on attachment surface 31 of seating plate 3. Four columnar portions 36 are disposed at four corners of base 30 having a square shape, and four columnar portions 36 support capacitor body 2 from a periphery. In other words, two pairs of columnar portions 36 are provided on attachment surface 31 of seating plate 3, and each pair of columnar portions 36 are provided at positions facing each other with capacitor body 2 interposed therebetween. Accordingly, since columnar portions 36 supports capacitor body 2, even in a case where vibration is applied to substrate 100 on which electrolytic capacitor 1 is mounted, vibration of capacitor body 2 with respect to substrate 100 is suppressed, and a possibility that capacitor body 2 is peeled off from substrate 100 can be reduced.

Note that, in the present exemplary embodiment, two pairs of columnar portions 36 are provided on attachment surface 31 of seating plate 3, but a pair or three or more pairs of columnar portions 36 may be provided on attachment surface 31. That is, a pair or a plurality of pairs of columnar portions 36 may be provided on attachment surface 31 of seating plate 3, and each pair of columnar portions 36 may be provided at positions facing each other with capacitor body 2 interposed therebetween.

Base 30 has a square shape, and distal end portions 23 of the pair of lead terminals 22 protrude from two opposing sides of base 30.

Here, a planar shape of base 30 is formed in a shape obtained by obliquely cutting two corners (two corners on a left side in FIG. 1) at both ends of a side from which lead terminal 22A on the anode side protrudes among the four corners, and a polarity of lead terminal 22 can be discriminated from the shape of base 30. In addition, four columnar portions 36 protrude upward from the four corners of attachment surface 31 of base 30. Among four columnar portions 36, two first columnar portions 36A positioned at both the ends of the side from which lead terminal 22A on the anode side protrudes are lower in height than other two second columnar portions 36B. Accordingly, the polarity of lead terminal 22 can also be discriminated from a difference in height between first columnar portion 36A and second columnar portion 36B.

As illustrated in FIGS. 5 to 7 and 9, the pair of through-holes 33 into which the pair of lead terminals 22 of capacitor body 2 are inserted is provided in base 30. The pair of through-holes 33 are provided side by side on the X-axis. On mounting surface 32 (lower surface) of base 30, terminal storage groove 34 that houses distal end portion 23 of lead terminal 22 is provided along the X-axis in continuation to each through-hole 33. That is, the pair of through-holes 33 corresponds to the pair of terminal storage grooves 34 on a one-to-one basis. Each of the pair of through-holes 33 is formed in a bottom surface of corresponding terminal storage groove 34, and penetrates base 30 in the up-down direction (thickness direction). A depth of each of the pair of terminal storage grooves 34 is smaller than a thickness of distal end portion 23 of lead terminal 22. In the present exemplary embodiment, for example, a thickness of base 30 is 0.8 mm, and the depth of each of the pair of terminal storage grooves 34 is 0.45 mm, but these dimensions are examples and can be appropriately changed.

At a lower end of an end face of each terminal storage groove 34 (that is, an end on an opening side of each terminal storage groove 34), chamfered portion 35 is formed by obliquely cutting the lower end of the end face. Chamfered portion 35 is provided, and thus, a section of each of the pair of terminal storage grooves 34 is formed in a sectional shape in which a width at the opening side is wider than a width at a bottom side. Accordingly, when electrolytic capacitor 1 is mounted on substrate 100, there is an advantage that a shape of the solder fillet formed in distal end portion 23 of lead terminal 22 is improved and joint strength is improved.

As illustrated in FIGS. 1 and 5, on mounting surface 32 of seating plate 3 (base 30), a pair of auxiliary terminals 6 are provided respectively at both sides of each of the pair of terminal storage grooves 34. In the present exemplary embodiment, since the pair of terminal storage grooves 34 are provided on mounting surface 32 and two auxiliary terminals 6 are provided for each of the pair of terminal storage grooves 34, four auxiliary terminals 6 are provided on mounting surface 32 in total. In addition, the pair of auxiliary terminals 6 disposed respectively at both sides of each of the pair of terminal storage grooves 34 are separated from each other. That is, since there is no portion connecting the pair of auxiliary terminals 6 on both sides of each terminal storage groove 34, the number of portions to be bent can be reduced as compared with a case where the pair of auxiliary terminals 6 are integrally connected. Accordingly, since it is possible to reduce the warpage caused in seating plate 3 due to the stress remaining in the bent portion of auxiliary terminal 6, it is possible to suppress the lifting of auxiliary mounting portion 60, and it is possible to suppress the decrease in the joint strength between auxiliary mounting portion 60 and substrate 100.

Figure 8:
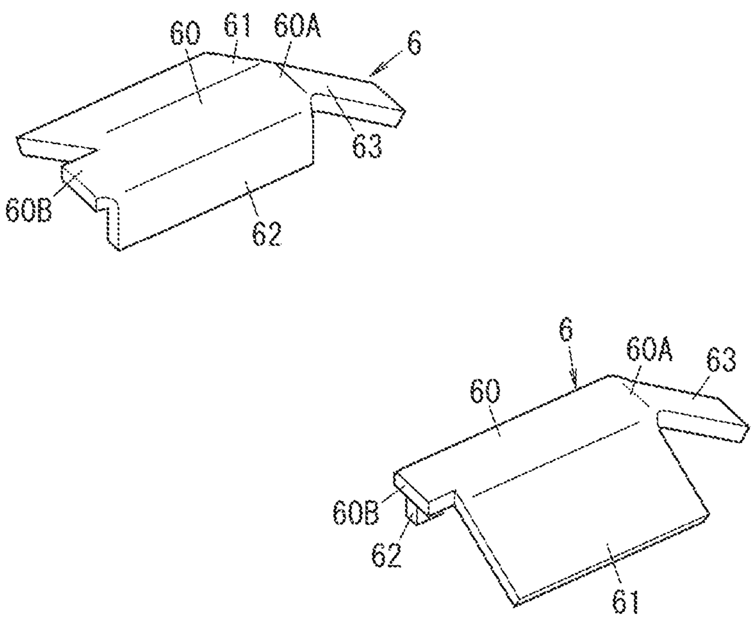
FIG. 8 is a perspective view illustrating an auxiliary terminal embedded in the seating plate.
Figure 9:
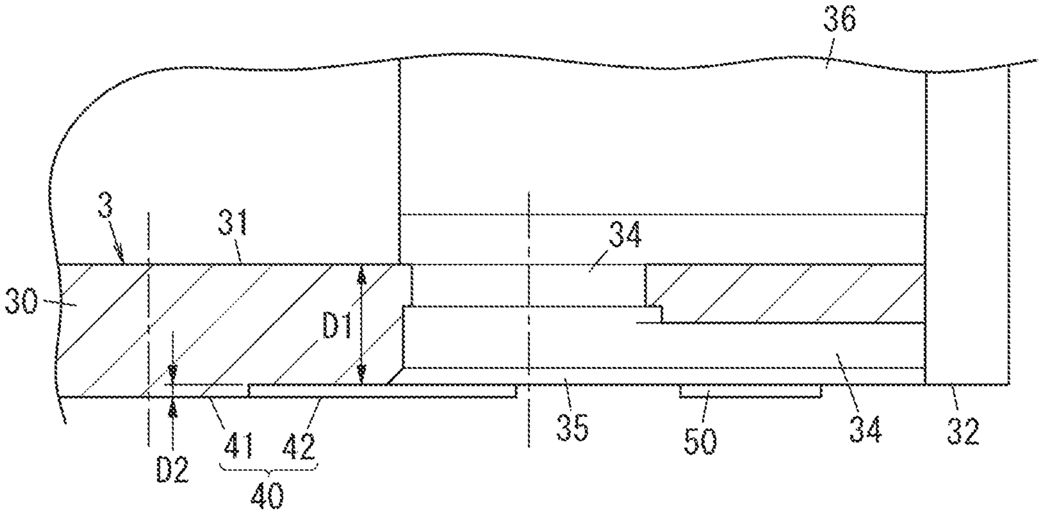
FIG. 9 is a sectional view illustrating a main part of the seating plate.

As illustrated in FIGS. 1 and 8, auxiliary terminal 6 includes auxiliary mounting portion 60 having a rectangular shape disposed along the X-axis (first axis), and first embedded portion 61 and second embedded portion 62, respectively, protruding from both sides of auxiliary mounting portion 60 along the Y-axis (second axis).

A planar shape of auxiliary mounting portion 60 is a rectangular shape in which sides along the X-axis are long sides. First embedded portion 61 protrudes from a long side farther from terminal storage groove 34, among two long sides of auxiliary mounting portion 60, and second embedded portion 62 protrudes from a long side closer to terminal storage groove 34. First embedded portion 61 protrudes in an orientation (obliquely upward) obliquely intersecting a perpendicular line of auxiliary mounting portion 60, and second embedded portion 62 protrudes in an orientation (upward) orthogonal to auxiliary mounting portion 60. Note that, the term "orthogonal" is not limited to a case where two surfaces intersect at an angle of 90 degrees, and an intersection angle of two surfaces may be deviated by about several degrees from 90 degrees.

Here, in the first axis (X-axis), first end 60A of auxiliary mounting portion 60 closer to adjacent through-hole 33 among the pair of through-holes 33 is disposed at a position closer to an outer edge of seating plate 3 than adjacent through-hole 33. That is, in FIG. 5, first ends 60A (left end portions) of two auxiliary mounting portions 60 disposed on a right side of seating plate 3 are disposed at positions closer to a right side edge (outer edge) of seating plate 3 than edge portion 33A of through-hole 33 on a right side. In addition, in FIG. 5, first ends 60A (right end portions) of two auxiliary mounting portions 60 disposed on a left side of seating plate 3 are disposed at positions closer to a left side edge (outer edge) of seating plate 3 than edge portion 33A of through-hole 33 on a left side. Accordingly, auxiliary mounting portion 60 can be disposed near distal end portion 23 of lead terminal 22 stored in terminal storage groove 34. Accordingly, there is an advantage that auxiliary mounting portion 60 can be reliably soldered to land 101 of substrate 100 to which distal end portion 23 of lead terminal 22 is soldered and the joint strength is improved. In FIG. 1, land 101 formed on substrate 100 on which electrolytic capacitor 1 is mounted is indicated by a dashed double-dotted line. Note that, land 101 illustrated in FIG. 1 is an example, and a size and a shape of land 101 can be appropriately changed.

Further, second end 60B of auxiliary mounting portion 60 reaches an end face of seating plate 3. Second end 60B of auxiliary mounting portion 60 is an end portion farther from adjacent through-hole 33 among the pair of through-holes 33 in the first axis (X-axis). Here, through-hole 33 adjacent to auxiliary mounting portion 60 is through-hole 33 provided in the bottom surface of terminal storage groove 34 to which auxiliary mounting portion 60 is adjacent. A case where second end 60B of auxiliary mounting portion 60 reaches the end face of seating plate 3 means that second end 60B is at the same position as the end face of seating plate 3 in the first axis (X-axis), or second end 60B further protrudes outward from the end face of seating plate 3. Since second end 60B of auxiliary mounting portion 60 is provided up to a position where the second end reaches the end face of seating plate 3, there is an advantage that an area of auxiliary mounting portion 60 joined to land 101 of substrate 100 by solder can be increased and the joint strength is improved. Note that, in the present exemplary embodiment, second end 60B of auxiliary mounting portion 60 protrudes outward from the end face of seating plate 3, but auxiliary terminal 6 may be disposed at a position where a distal end face of second end 60B is flush with the end face of seating plate 3.

Further, third embedded portion 63 protruding from first end 60A is provided in auxiliary mounting portion 60. Third embedded portion 63 is embedded in seating plate 3. Third embedded portion 63 protrudes in the orientation (obliquely upward) obliquely intersecting the perpendicular line of auxiliary mounting portion 60. Entire third embedded portion 63 is not necessarily embedded in seating plate 3, and at least a part of third embedded portion 63 may be embedded in seating plate 3. Third embedded portion 63 is embedded in seating plate 3 by, for example, molding, but may be embedded in seating plate 3 by press-fitting third embedded portion 63 into seating plate 3. Since first to third embedded portions 61 to 63 are embedded in seating plate 3, it is possible to suppress the lifting of auxiliary mounting portion 60, and it is possible to improve the joint strength of auxiliary mounting portion 60 to substrate 100.

Here, since third embedded portion 63 is not exposed from terminal storage groove 34 in a state where third embedded portion 63 is embedded in seating plate 3, a possibility that third embedded portion 63 interferes with distal end portion 23 of lead terminal 22 inserted into terminal storage groove 34 can be reduced, and a work of attaching capacitor body 2 to seating plate 3 can be smoothly performed.

Further, in the present exemplary embodiment, first embedded portion 61, second embedded portion 62, and third embedded portion 63 protrude from three sides of auxiliary mounting portion 60 in directions different from each other, and first embedded portion 61, second embedded portion 62, and third embedded portion 63 are provided apart from each other. Accordingly, there is an advantage that auxiliary terminal 6 is hardly detached from seating plate 3, and there is an advantage that vibration resistance performance is improved since electrolytic capacitor 1 is firmly fixed to substrate 100 in a state where electrolytic capacitor 1 is mounted on substrate 100.

Here, on mounting surface 32 of seating plate 3, auxiliary terminal 6 is preferably disposed away from adjacent terminal storage groove 34 among the pair of terminal storage grooves 34 by ¾ or more of width W3 of auxiliary mounting portion 60. In other words, auxiliary terminal 6 is preferably disposed on mounting surface 32 such that distance W1 from auxiliary mounting portion 60 of auxiliary terminal 6 to the end face of terminal storage groove 34 is ¾ or more of width W3 of auxiliary mounting portion 60. When the distance from auxiliary mounting portion 60 to the end face of terminal storage groove 34 is shortened, and when electrolytic capacitor 1 is mounted on substrate 100, solder flows through auxiliary mounting portion 60, and thus, a sufficient amount of solder fillets may not be formed in distal end portion 23 of lead terminal 22. In the present exemplary embodiment, since auxiliary terminal 6 is disposed away from adjacent terminal storage groove 34 by ¾ or more of width W3 of auxiliary mounting portion 60, there is an advantage that a sufficient amount of solder fillets are easily formed in lead terminal 22 and auxiliary mounting portion 60, and the joint strength is improved.

Note that, in the present exemplary embodiment, auxiliary terminal 6 is disposed away from adjacent terminal storage groove 34 among the pair of terminal storage grooves 34 by ⅕ or more of width W2 of terminal storage groove 34, but is preferably disposed away by ⅓ or more of width W2 of terminal storage groove 34. In a case where width W3 of auxiliary mounting portion 60 of auxiliary terminal 6 is large, even though auxiliary terminal 6 is disposed away from terminal storage groove 34 by ⅕ or more of width W2, distance W1 from auxiliary mounting portion 60 to terminal storage groove 34 may not be set to ¾ or more of width W3 of auxiliary mounting portion 60. In such a case, auxiliary terminal 6 may be disposed away from terminal storage groove 34 by ⅓ or more of width W2 of terminal storage groove 34, and a sufficient amount of solder fillets can be formed in lead terminal 22 and auxiliary mounting portion 60 by setting distance W1 from auxiliary mounting portion 60 to terminal storage groove 34 to be ¾ or more of width W3 of auxiliary mounting portion 60.

Further, on mounting surface 32 of seating plate 3, first projection 40 is provided at a portion between the pair of through-holes 33. A projecting amount of first projection 40 is a dimension smaller than a distance from mounting surface 32 to distal end portion 23 of lead terminal 22. In the present exemplary embodiment, for example, thickness D1 (see FIG. 9) of seating plate 3 is 0.8 mm, projecting amount D2 (see FIG. 9) of first projection 40 is 0.1 mm, and projecting amount D2 of first projection 40 is 12.5% of thickness D1 of seating plate 3. Here, thickness D1 of seating plate 3 is a thickness of a plate-shaped portion of seating plate 3 excluding columnar portion 36, first projection 40, and the like. Projecting amount D2 of projection 40 can be appropriately changed, but is preferably from 3% to 45% inclusive of thickness D1 of seating plate 3. The projecting amount of projection 40 is set to be from 3% to 45% inclusive of the thickness of seating plate 3, and thus, it is possible to reduce the thickness while suppressing the warpage of seating plate 3.

First projection 40 extends along the Y-axis and includes narrow portion 41 positioned between the pair of through-holes 33 and wide portions 42 disposed respectively at both sides with respect to narrow portion 41 in the Y-axis. A width of wide portion 42 along the X-axis is larger than a width of narrow portion 41 along the X-axis. More specifically, first projection 40 is formed in a planar shape in which a semicircular portion is coupled to two opposing sides of a rectangle and the other two opposing sides of the rectangle are scraped by two circles with the pair of through-holes 33 as centers. Accordingly, as compared with a case where first projection 40 is formed in a rectangular shape, an area can be increased by wide portions 42, and the warpage of seating plate 3 can be reduced by increasing rigidity of seating plate 3.

Since wide portion 42 of first projection 40 includes a portion (widened portion) in which a width along the first axis increases as a distance from narrow portion 41 along the second axis increases, the area of first projection 40 can be increased to reduce the warpage of seating plate 3. In addition, since the widened portion of wide portion 42 has a gradually increased width along the first axis as the distance from narrow portion 41 increases, it is possible to reduce stress generated by expansion or contraction and reduce the warpage of seating plate 3.

The area of first projection 40 can be appropriately changed, but is preferably from 5% to 50% inclusive of an area of mounting surface 32. Here, the area of mounting surface 32 is an area of a region surrounded by an outer edge of mounting surface 32, and includes an area of the pair of through-holes 33. In the present exemplary embodiment, for example, the area of mounting surface 32 is 102 $mm^2$, the area of first projection 40 is 21.2 $mm^2$, and the area of first projection 40 is about 20.8% of the area of mounting surface 32. The area of first projection 40 is set to be in a range from 5% to 50%, inclusive, of the area of mounting surface 32, and thus, it is possible to suppress the warpage of seating plate 3 and to suppress the decrease in the joint strength.

Further, on mounting surface 32 of seating plate 3, second projections 50 having a circular shape are provided at portions corresponding to four columnar portions 36. In other words, on mounting surface 32 of seating plate 3, second projection 50 is provided at a position opposite to a position of columnar portion 36 in attachment surface 31. Here, a projecting amount of second projection 50 is substantially the same as the projecting amount of first projection 40. Since second projection 50 is provided at a position opposite to a position of columnar portion 36 in attachment surface 31, a weight of columnar portion 36 can be supported by second projection 50 coming into contact with substrate 100, and deformation of base 30 can be suppressed.

Capacitor body 2 and seating plate 3 have the above-described structure, and electrolytic capacitor 1 is realized by holding capacitor body 2 by seating plate 3. More specifically, capacitor body 2 is disposed on attachment surface 31 of seating plate 3 in a state where the pair of lead terminals 22 are inserted into the pair of through-holes 33. In the pair of lead terminals 22, distal end portions 23 protruding downward from the pair of through-holes 33 are bent in orientations opposite to each other, and thus, distal end portions 23 of the pair of lead terminals 22 are disposed in the pair of terminal storage grooves 34, respectively. Here, capacitor body 2 is attached to seating plate 3 by sandwiching base 30 between distal end portions 23 of the pair of lead terminals 22 and the bottom surface of container 21. In a state where capacitor body 2 is attached to seating plate 3, since distal end portions 23 of the pair of lead terminals 22 are, respectively, inserted into the pair of terminal storage grooves 34 of base 30, rotation of container 21 with respect to base 30 is restricted.

Then, electrolytic capacitor 1 is mounted on substrate 100 by soldering distal end portions 23 of the pair of lead terminals 22 disposed on mounting surface 32 and the pair of auxiliary terminals 6 disposed on both sides of each of distal end portions 23 to land 101 of substrate 100.

(3) Modifications

The above exemplary embodiment is merely one of various exemplary embodiments of the present disclosure. The above exemplary embodiment can be variously changed in accordance with design and the like as long as the object of the present disclosure can be achieved.

Hereinafter, modifications of the above exemplary embodiment will be recited. The modifications to be described below can be applied in appropriate combination.

(3.1) Modification of First Projection

Modifications of first projection 40 will be described with reference to FIGS. 10 to 14.

Figure 10:
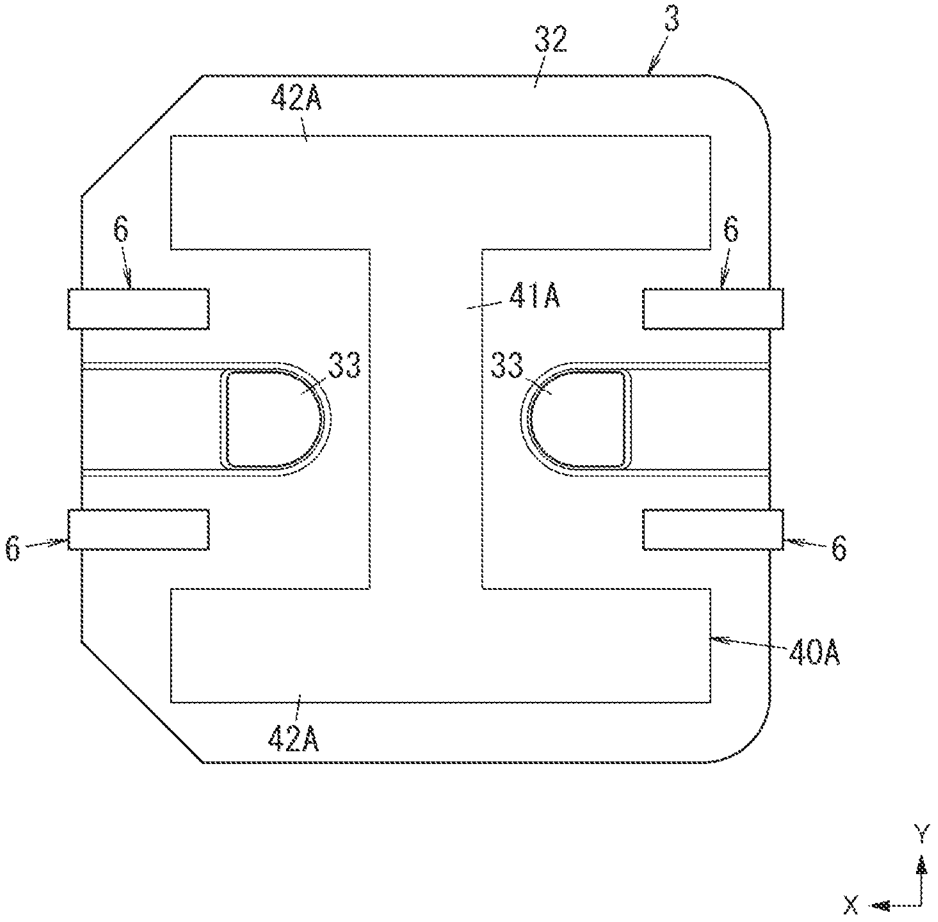
FIG. 10 is a bottom view illustrating a seating plate included in an electrolytic capacitor according to a first modification.

FIG. 10 illustrates a first modification of the first projection. First projection 40A of the first modification is formed in an H shape by narrow portion 41A having a rectangular shape extending along the Y-axis and wide portion 42A having a rectangular shape connected to both ends of narrow portion 41A and extending along the X-axis.

Figure 11:
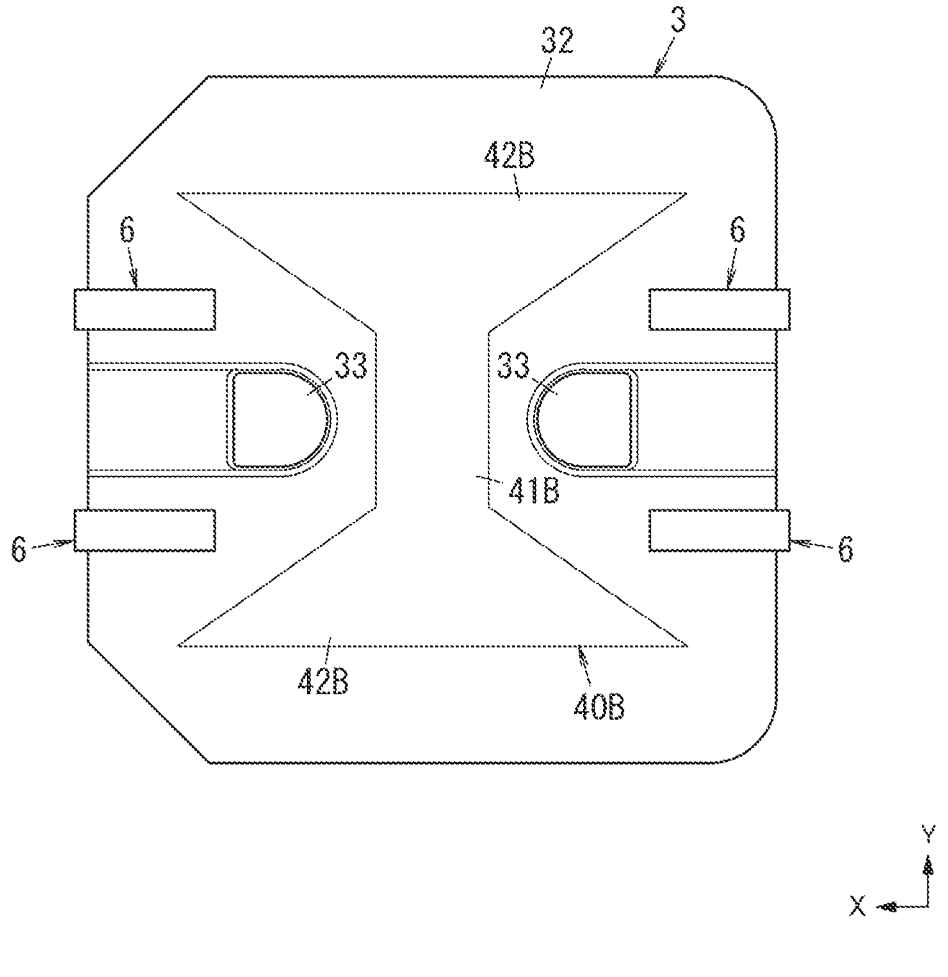
FIG. 11 is a bottom view illustrating a seating plate included in an electrolytic capacitor according to a second modification.

FIG. 11 illustrates a second modification of the first projection. First projection 40B of the second modification includes narrow portion 41B having a rectangular shape extending along the Y-axis and a pair of wide portions 42B connected to both ends of narrow portion 41B. The pair of wide portions 42B are formed in a trapezoidal shape in which a width along the X-axis increases as a distance from narrow portion 41B along the Y-axis increases.

Figure 12:
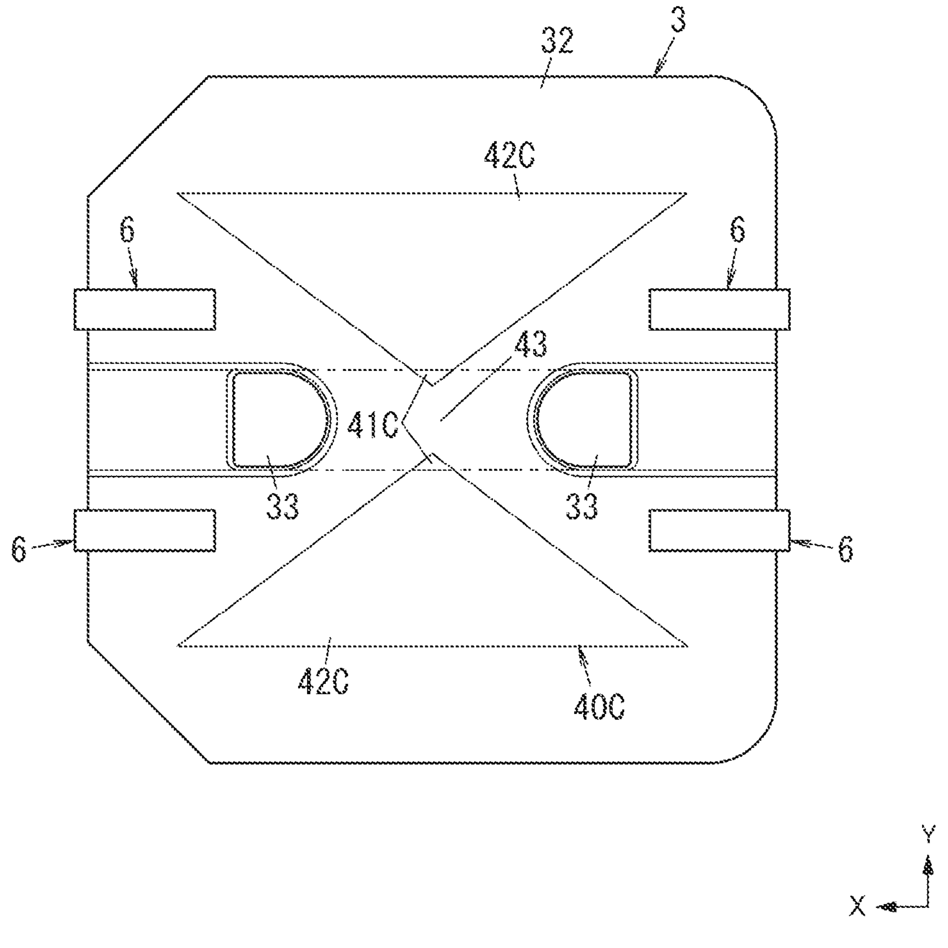
FIG. 12 is a bottom view illustrating a seating plate included in an electrolytic capacitor according to a third modification.

FIG. 12 illustrates a third modification of the first projection. Groove 43 that divides first projection 40C into two parts arranged along the second axis (Y-axis) is provided in first projection 40C of the third modification. In first projection 40C, a shape of each of two parts divided by groove 43 is, for example, a triangular shape, and includes narrow portion 41C positioned between the pair of through-holes 33 and wide portion 42C. Wide portion 42C is formed in such a shape that a width along the X-axis increases as a distance from narrow portion 41C along the Y-axis increases. Since first projection 40C provided between the pair of through-holes 33 is divided into two parts arranged along the Y-axis by groove 43, there is an advantage that air can be released through groove 43 when distal end portions 23 of the pair of lead terminals 22 are soldered to land 101 of substrate 100, and mountability is improved. Note that, in the third modification, narrow portion 41C is divided into two parts by groove 43, and each of wide portions 42C is provided at a side of each of narrow portions 41C formed as two parts.

Figure 13:
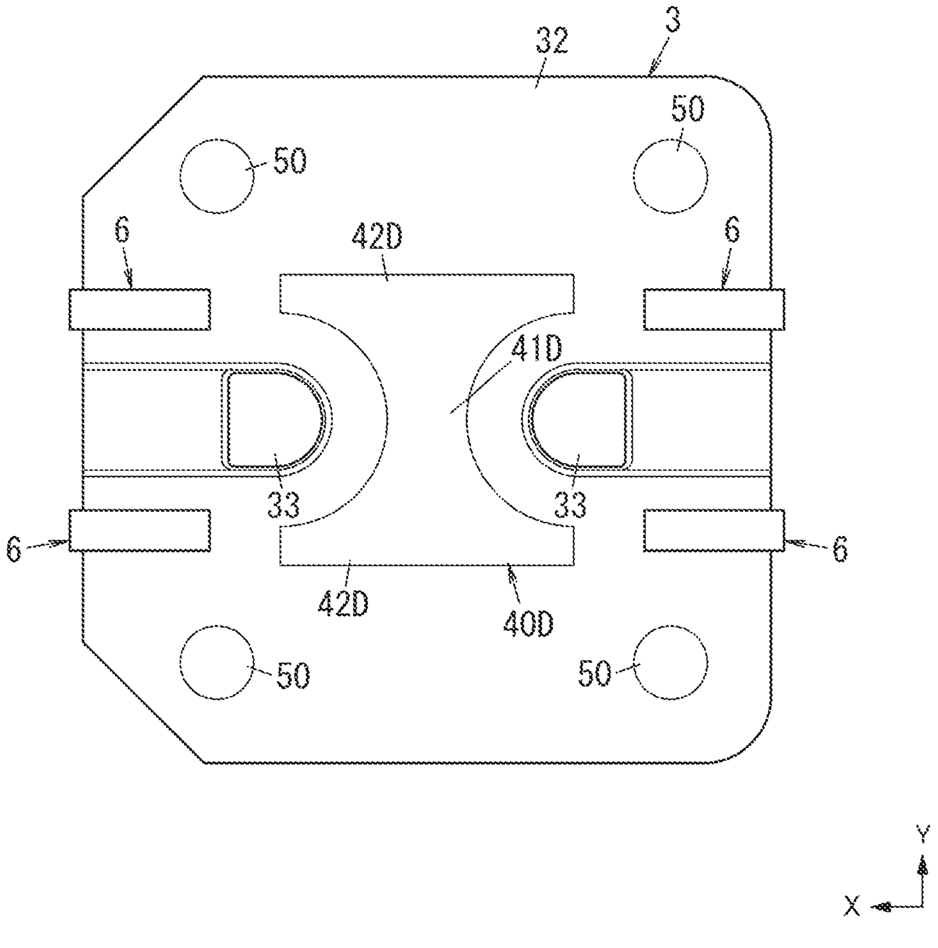
FIG. 13 is a bottom view illustrating a seating plate included in an electrolytic capacitor according to a fourth modification.

FIG. 13 illustrates a fourth modification of the first projection. First projection 40D of the fourth modification includes narrow portion 41D and wide portions 42D positioned on both sides of narrow portion 41D. Narrow portion 41D has a shape similar to narrow portion 41 of first projection 40 of the above exemplary embodiment, but wide portion 42D is formed in a shape obtained by cutting a semicircular portion with a straight line.

Figure 14:
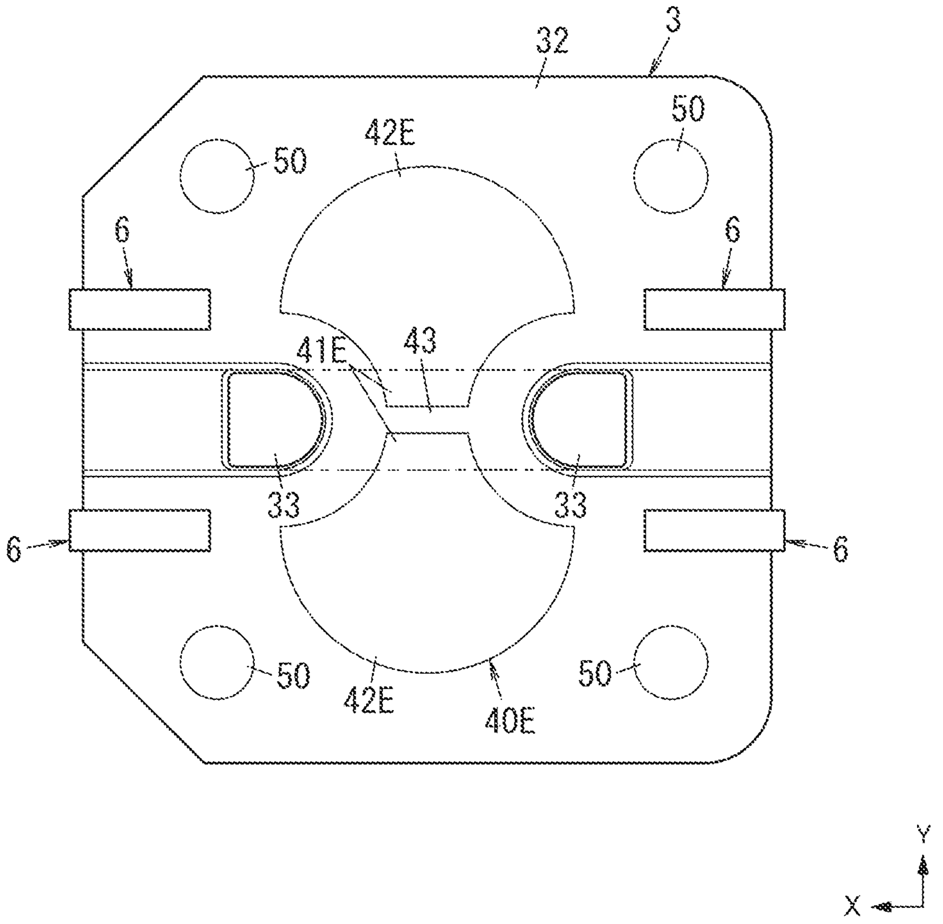
FIG. 14 is a bottom view illustrating a seating plate included in an electrolytic capacitor according to a fifth modification.

FIG. 14 illustrates a fifth modification of the first projection. First projection 40E of the fifth modification includes narrow portion 41E and wide portions 42E positioned on both sides of narrow portion 41E. First projection 40E of the fifth modification is formed in a shape in which first projection 40 of the above exemplary embodiment is divided into two parts by groove 43.

Note that, the shape of the first projection is not limited to the shapes of the above-described exemplary embodiment and first to fifth modifications, and can be appropriately changed.

Further, in the third modification and fifth modification, only one groove 43 dividing first projection 40 is provided, but groove 43 is not limited to the forms of the third modification and fifth modification, and the number, shape, and position of grooves 43 can be appropriately changed.

(3.2) Other Modifications

Electrolytic capacitor 1 may include the pair of lead terminals 22, and may include three or more lead terminals 22.

A shape of lead terminal 22 is not limited to have a shape bent for surface mounting. The shape of lead terminal 22 may have a linear shape. That is, electrolytic capacitor 1 may be a so-called radial lead type electrolytic capacitor.

In the present exemplary embodiment, auxiliary terminals 6 are disposed at both sides of each terminal storage groove 34 in the second axis, but auxiliary terminals 6 may be disposed only at one side in the second axis.

The shape of auxiliary terminal 6 is not limited to the shape described in the exemplary embodiment. Although auxiliary terminal 6 includes third embedded portion 63, third embedded portion 63 is not essential and can be omitted as appropriate.

Although the lower end of the end face of terminal storage groove 34 is chamfered, the sectional shape of terminal storage groove 34 is not limited to the shape illustrated in the exemplary embodiment. Terminal storage groove 34 may be formed in a sectional shape in which the opening side of terminal storage groove 34 expands by providing a step portion on the end face of the terminal storage groove.

Although container 21 of capacitor body 2 has the cylindrical shape, a shape of container 21 can be appropriately changed, and may have a prismatic shape or the like.

Conclusion

As described above, electrolytic capacitor (1) of a first aspect includes capacitor body (2) and seating plate (3). Capacitor body (2) that includes a capacitor element, container (21) housing the capacitor element, and a pair of lead terminals (22) protruding from a bottom surface of container (21). Container (21) has a bottomed cylindrical shape. Capacitor body (2) is attached to attachment surface (31) of seating plate (3). Seating plate (3) has a pair of through-holes (33) into which the pair of lead terminals (22) are inserted, respectively. Seating plate (3) has mounting surface (32) opposite to attachment surface (31). Mounting surface (32) has a pair of terminal storage grooves (34) and projection (40 or 40A to 40E). Distal end portions (23) of the pair of lead terminals (22) inserted into the pair of through-holes (33), respectively, to be bent along mounting surface (32) are inserted into the pair of terminal storage grooves (34), respectively. Projection (40 or 40A to 40E) protrudes from a portion including at least an intermediate portion between the pair of through-holes (33). Projection (40 or 40A to 40E) includes narrow portion (41 or 41A to 41E) and wide portions (42 or 42A to 42E). Narrow portion (41 or 41A to 41E) is positioned between the pair of through-holes (33). Wide portions (42 or 42A to 42E) are disposed respectively at both sides with respect to narrow portion (41 or 41A to 41E) in a second axis intersecting a first axis along which the pair of through-holes (33) are arranged. A width of wide portion (42 or 42A to 42E) along the first axis is larger than a width of narrow portion (41 or 41A to 41E) along the first axis.

According to this aspect, since projection (40 or 40A to 40E) includes wide portions (42 or 42A to 42E) disposed respectively at both sides with respect to narrow portion (41 or 41A to 41E) in the second axis, an area of projection (40 or 40A to 40E) can be increased as compared with a case where there are no wide portions (42 or 42A to 42E). Accordingly, as compared with a case where there are no wide portions (42 or 42A to 42E), since rigidity of seating plate (3) can be increased and warpage of seating plate (3) can be suppressed, it is possible to suppress a decrease in joint strength in a state of being mounted on substrate (100).

In the first aspect, in electrolytic capacitor (1) of a second aspect, wide portion (42 or 42A to 42E) includes a portion in which a width along the first axis increases as a distance from narrow portion (41 or 41A to 41E) along the second axis increases.

According to this aspect, as compared with a case where there are no wide portions (42 or 42A to 42E), since the rigidity of seating plate (3) can be increased, and the warpage of seating plate (3) can be suppressed, it is possible to suppress the decrease in the joint strength in the state of being mounted on substrate (100).

In the first or second aspect, in electrolytic capacitor (1) of a third aspect, a projecting amount of projection (40 or 40A to 40E) ranges from 3% to 45%, inclusive, of a thickness of seating plate (3).

According to this aspect, as compared with a case where there are no wide portions (42 or 42A to 42E), since the rigidity of seating plate (3) can be increased, and the warpage of seating plate (3) can be suppressed, it is possible to suppress the decrease in the joint strength in the state of being mounted on substrate (100).

In any one of the first to third aspects, in electrolytic capacitor (1) of a fourth aspect, projection (40 or 40A to 40E) has groove (43) that divides projection (40 or 40A to 40E) into two parts arranged along the second axis.

According to this aspect, there is an advantage that air can be released through groove (43) when distal end portions (23) of the pair of lead terminals (22) are soldered to land (101) of substrate (100), and mountability is improved.

In any one of the first to fourth aspects, in electrolytic capacitor (1) of a fifth aspect, an area of projection (40 or 40A to 40E) ranges from 5% to 50%, inclusive, of an area of mounting surface (32).

According to this aspect, as compared with a case where there are no wide portions (42 or 42A to 42E), since the rigidity of seating plate (3) can be increased, and the warpage of seating plate (3) can be suppressed, it is possible to suppress the decrease in the joint strength in the state of being mounted on substrate (100).

In any one of the first to fifth aspects, in electrolytic capacitor (1) of a sixth aspect, seating plate (3) further includes columnar portion (36) on attachment surface (31) of seating plate (3). Columnar portion (36) supports capacitor body (2).

According to this aspect, columnar portion (36) supports capacitor body (2), and thus, there is an advantage that electrolytic capacitor (1) is hardly detached from substrate (100) by vibration.

In the sixth aspect, in electrolytic capacitor (1) of a seventh aspect, seating plate (3) includes a pair of columnar portions (36) including the columnar portion (36) on attachment surface (31). The pair of columnar portions (36) are provided at respective positions facing each other with capacitor body (2) interposed between the pair of columnar portions (36).

According to this aspect, each pair of columnar portions (36) supports capacitor body (2) from both sides, and thus, there is an advantage that electrolytic capacitor (1) is hardly detached from substrate (100) by vibration.

In the seventh aspect, in electrolytic capacitor (1) of an eighth aspect, projection (40 or 40A to 40E) is first projection (40 or 40A to 40E). Mounting surface (32) of seating plate (3) further includes second projection (50) located at a position opposite to a position of columnar portion (36) in attachment surface (31).

According to this aspect, a weight of columnar portion (36) can be supported by second projection (50) coming into contact with substrate (100), and the warpage of seating plate (3) can be reduced.

Seating plate (3) of a ninth aspect is seating plate (3) included in electrolytic capacitor (1). Electrolytic capacitor (1) includes capacitor body (2) that includes a capacitor element, container (21) housing the capacitor element, and a pair of lead terminals (22) protruding from a bottom surface of container (21). Container (21) has a bottomed cylindrical shape. Capacitor body (2) is attached to attachment surface (31) of seating plate (3). Seating plate (3) has a pair of through-holes (33) into which the pair of lead terminals (22) are inserted, respectively. Seating plate (3) has mounting surface (32) opposite to attachment surface (31). Mounting surface (32) has a pair of terminal storage grooves (34) and projection (40 or 40A to 40E). Distal end portions (23) of the pair of lead terminals (22) inserted into the pair of through-holes (33), respectively, to be bent along mounting surface (32) are inserted into the pair of terminal storage grooves (34), respectively. Projection (40 or 40A to 40E) protrudes from a portion including at least an intermediate portion between the pair of through-holes (33). Projection (40 or 40A to 40E) includes narrow portion (41 or 41A to 41E) and wide portions (42 or 42A to 42E). Narrow portion (41 or 41A to 41E) is positioned between the pair of through-holes (33). Wide portions (42 or 42A to 42E) are disposed respectively at both sides with respect to narrow portion (41 or 41A to 41E) in a second axis intersecting a first axis along which the pair of through-holes (33) are arranged. A width of wide portion (42 or 42A to 42E) along the first axis is larger than a width of narrow portion (41 or 41A to 41E) along the first axis.

According to this aspect, since projection (40 or 40A to 40E) includes wide portions (42 or 42A to 42E) disposed respectively at both sides with respect to narrow portion (41 or 41A to 41E) in the second axis, an area of projection (40 or 40A to 40E) can be increased as compared with a case where there are no wide portions (42 or 42A to 42E). Accordingly, as compared with a case where there are no wide portions (42 or 42A to 42E), since rigidity of seating plate (3) can be increased and warpage of seating plate (3) can be suppressed, it is possible to suppress a decrease in joint strength in a state of being mounted on substrate (100).

The configurations according to the second to eighth aspects are not essential configurations for solid electrolytic capacitor (1), but may be omitted as appropriate.

REFERENCE MARKS IN THE DRAWINGS

1 electrolytic capacitor
2 capacitor body
3 seating plate
21 container
22 lead terminal
23 distal end portion
31 attachment surface
32 mounting surface
33 through-hole
34 terminal storage groove
36 columnar portion
40 first projection (projection)
41 narrow portion
42 wide portion
43 groove
50 second projection

The invention claimed is:

1. An electrolytic capacitor comprising:

a capacitor body that includes a capacitor element, a container housing the capacitor element, and a pair of lead terminals protruding from a bottom surface of the container, the container having a bottomed cylindrical shape; and a seating plate that has an attachment surface to which the capacitor body is attached, wherein:

the seating plate has a pair of through-holes into which the pair of lead terminal are inserted, respectively, the seating plate has a mounting surface opposite to the attachment surface, the mounting surface having a pair of terminal storage grooves into which distal end portions of the pair of lead terminals are inserted, respectively, and a projection protruding from a portion including at least an intermediate portion between the pair of through-holes, the pair of lead terminals being inserted into the pair of through-holes, respectively, to be bent along the mounting surface, the projection includes a narrow portion and wide portions, the narrow portion being positioned between the pair of through-holes, the wide portions being disposed respectively at both sides with respect to the narrow portion in a second axis intersecting a first axis along which the pair of through-holes are arranged, a width of the wide portion along the first axis is larger than a width of the narrow portion along the first axis, and an area of the projection ranges from 5% to 50%, inclusive, of an area of the mounting surface, the area of the projection being an area of a region surrounded by an outer edge of the projection when viewed in a direction perpendicular to the mounting surface.

2. The electrolytic capacitor according to claim 1, wherein the wide portion includes a portion in which a width along the first axis increases as a distance from the narrow portion along the second axis increases.

3. The electrolytic capacitor according to claim 1, wherein a projecting amount of the projection ranges from 3% to 45%, inclusive, of a thickness of the seating plate.

4. The electrolytic capacitor according to claim 1, wherein, the projection has a groove that divides the projection into two parts arranged along the second axis.

5. The electrolytic capacitor according to claim 1, wherein the seating plate further includes a columnar portion on the attachment surface, the columnar portion supporting the capacitor body.

6. The electrolytic capacitor according to claim 5, wherein:

the seating plate includes a pair of columnar portions including the columnar portion on the attachment surface, and the pair of columnar portions are provided at respective positions facing each other with the capacitor body interposed between the pair of columnar portions.

7. The electrolytic capacitor according to claim 6, wherein:

the projection is a first projection, and the mounting surface of the seating plate further includes a second projection located at a position opposite to a position of the columnar portion in the attachment surface.

8. A seating plate provided in an electrolytic capacitor, wherein:

the electrolytic capacitor includes a capacitor body that includes a capacitor element, a container housing the capacitor element, and a pair of lead terminals protruding from a bottom surface of the container, the container having a bottomed cylindrical shape, and the capacitor body is attached to an attachment surface of the seating plate, the seating plate has a pair of through-holes into which the pair of lead terminals are inserted, respectively, the seating plate has a mounting surface opposite to the attachment surface, the mounting surface having a pair of terminal storage grooves into which distal end portions of the pair of lead terminals are inserted, respectively, and a projection protruding from a portion including at least an intermediate portion between the pair of through-holes, the pair of lead terminals being inserted into the pair of through-holes, respectively, to be bent along the mounting surface, the projection includes a narrow portion and wide portions, the narrow portion being positioned between the pair of through-holes, the wide portions being disposed respectively at both sides with respect to the narrow portion in a second axis intersecting a first axis along which the pair of through-holes are arranged, a width of the wide portion along the first axis is larger than a width of the narrow portion along the first axis, and an area of the projection ranges from 5% to 50%, inclusive, of an area of the mounting surface, the area of the projection being an area of a region surrounded by an outer edge of the projection viewed in a direction perpendicular to the mounting surface.

9. An electrolytic capacitor comprising:

a capacitor body that includes a capacitor element, a container housing the capacitor element, and a pair of lead terminals protruding from a bottom surface of the container, the container having a bottomed cylindrical shape; and a seating plate that has an attachment surface to which the capacitor body is attached, wherein:

the seating plate has a pair of through-holes into which the pair of lead terminal are inserted, respectively, the seating plate has a mounting surface opposite to the attachment surface, the mounting surface having a pair of terminal storage grooves into which distal end portions of the pair of lead terminals are inserted, respectively, and a projection protruding from a portion including at least an intermediate portion between the pair of through-holes, the pair of lead terminals being inserted into the pair of through-holes, respectively, to be bent along the mounting surface, the projection includes a narrow portion and wide portions, the narrow portion being positioned between the pair of through-holes, the wide portions being disposed respectively at both sides with respect to the narrow portion in a second axis intersecting a first axis along which the pair of through-holes are arranged, a width of the wide portion along the first axis is larger than a width of the narrow portion along the first axis, and a projecting amount of the projection ranges from 3% to 45%, inclusive, of a thickness of the seating plate, the projecting amount of the projection being an amount projecting with respect to a part of the mounting surface at both side of each of the pair of terminal storage grooves.

10. An electrolytic capacitor comprising:

a capacitor body that includes a capacitor element, a container housing the capacitor element, and a pair of lead terminals protruding from a bottom surface of the container, the container having a bottomed cylindrical shape; and a seating plate that has an attachment surface to which the capacitor body is attached, wherein:

the seating plate has a pair of through-holes into which the pair of lead terminal are inserted, respectively, the seating plate has a mounting surface opposite to the attachment surface, the mounting surface having a pair of terminal storage grooves into which distal end portions of the pair of lead terminals are inserted, respectively, and a projection protruding from a portion including at least an intermediate portion between the pair of through-holes, the pair of lead terminals being inserted into the pair of through-holes, respectively, to be bent along the mounting surface, the projection includes a narrow portion and wide portions, the narrow portion being positioned between the pair of through-holes, the wide portions being disposed respectively at both sides with respect to the narrow portion in a second axis intersecting a first axis along which the pair of through-holes are arranged, a width of the wide portion along the first axis is larger than a width of the narrow portion along the first axis, and the projection is located away from an outer edge of the mounting surface when viewed in a direction perpendicular to the mounting surface.

11. The electrolytic capacitor according to claim 10, wherein:

an outer edge of the projection includes a curved part at an end of the projection in the second axis.

* * * * *